United States Patent [19]

Damsky et al.

[11] Patent Number: 5,671,524
[45] Date of Patent: Sep. 30, 1997

[54] MAGNETIC ANNEALING OF AMORPHOUS ALLOY FOR MOTOR STATORS

[75] Inventors: Ben Lee Damsky, Belmont; Jan Stein, Cupertino, both of Calif.

[73] Assignee: Electric Power Research Institute, Inc., Palo Alto, Calif.

[21] Appl. No.: 308,659

[22] Filed: Sep. 19, 1994

[51] Int. Cl.$^6$ ............................................. H02K 15/02
[52] U.S. Cl. .......................... 29/596; 29/609; 145/108
[58] Field of Search .......................... 29/596, 609, 598; 148/108; 361/143, 146, 147

[56] References Cited

U.S. PATENT DOCUMENTS

| | | | |
|---|---|---|---|
| 1,813,802 | 7/1931 | Hildebrand | 29/609 |
| 2,276,793 | 3/1942 | Prince | 29/596 |
| 4,116,728 | 9/1978 | Becker et al. | 148/108 |
| 4,227,120 | 10/1980 | Luborsky | 315/248 |
| 4,262,233 | 4/1981 | Becker et al. | 315/248 |
| 4,268,325 | 5/1981 | O'Handley et al. | 148/108 |
| 4,312,683 | 1/1982 | Sakakima et al. | 148/108 |
| 4,379,004 | 4/1983 | Makino et al. | 148/108 |
| 4,475,962 | 10/1984 | Hayakawa et al. | 148/108 |
| 4,528,481 | 7/1985 | Becker et al. | 315/248 |
| 4,621,416 | 11/1986 | Krause et al. | 29/606 |
| 4,639,278 | 1/1987 | Makino et al. | 148/108 |
| 4,668,309 | 5/1987 | Silgailis et al. | 148/108 |
| 5,075,814 | 12/1991 | Kubota et al. | 29/596 |

*Primary Examiner*—Carl E. Hall
*Attorney, Agent, or Firm*—Leonard Bloom

[57] ABSTRACT

A magnetically annealed amorphous metal motor stator is manufactured by magnetically annealing individually the stator yoke and stator teeth and then assembling the components to form a stator so that the field is radial in the teeth and varies or is circumferential in the yoke.

7 Claims, 10 Drawing Sheets

MAGNETIC ANNEALING OF AMORPHOUS ALLOY FOR MOTOR STATORS

FIELD OF THE INVENTION

The present invention relates to stators used in various types of motors and the use of amorphous alloys to produce such stators.

BACKGROUND OF THE INVENTION

Amorphous magnetic metal alloys are well known in the art. These metal alloys can be produced by rapidly heat quenching liquid metal compositions, for example, of iron and cobalt along with auxiliary chemicals to produce thin ribbons or wires. The alloy produced by this process is a glassy alloy (one in which the atoms are in a state of disarray).

The heating conditions under which the alloy is produced should be of such a time and temperature sufficient to relieve the alloy of all stresses. However, the temperature should not be less than would be required to initiate crystallization. Once the initial high temperature heating step is completed, the alloy is cooled to a lower temperature and held in a magnetic field to produce a magnetic amorphous metal alloy. This latter step is known in the art as magnetic annealing.

During the annealing step, the ribbon produced during the initial heating process is brought to a lower temperature for purposes of magnetic annealing. The direction of the field during the magnetic anneal may lie in the plane of the ribbon and be either parallel or transverse to its length. By controlling the direction of the field, the strength of the field, as well as the temperature-time cycle of the anneal, the magnetic properties of the resultant material may be varied to produce a wide range of different and useful characteristics for magnetic circuit elements.

A group of magnetic, amorphous metal alloys are commercially available and marketed under the trademark "Metglas". Further, methods for producing these alloys are described in U.S. Pat. Nos. 3,856,513 to Chen et al, 3,871,836 to Polk et al and 3,862,658 to Bedell.

The advantages of amorphous metal alloys in reducing magnetic losses in transformer cores is well established. Amorphous alloys require lower magnetization to produce a given field and thus when used in transformers involve lower power losses. In the manufacture of transformers, it is established practice to anneal the transformer core before final assembly. This annealing process involves raising the temperature of the transformer core to a temperature of about 300° C. while at the same time applying a magnetic field in the preferential direction over a period of several hours.

Magnetic annealing is well known in the patent literature.

In a specific application of magnetic annealing Sakakima et al in U.S. Pat. No. 4,312,683 disclose amorphous alloy films which are heat-treated in the presence of magnetic fields directed in a different orientations.

Another U.S. patent of interest is U.S. Pat. No. 4,312,683 to Sakakima et al which discloses amorphous alloy films which are heat-treated in the presence of magnetic fields directed in two directions. One field is applied vertically in a direction perpendicular to the plane of the film and a second field is applied in a rotating direction. This is done to suppress induced magnetic anisotrophy (opposed to isotrophy: anisotrophy refers to different values along the axis).

U.S. Pat. No. 4,268,325 to Handley et al offers a rather comprehensive disclosure involving electro-magnetic annealing of metal alloys. In that patent O'Handley et al state that glassy (atoms arranged in a disorderly array) metal alloys have demonstrated attractive soft ferromagnetic properties for relays, AC generators, transformers, motors and magnetic amplifiers. In a specific application Handley et al anneal a magnetic glassy alloy sheet by a process involving a magnetic anneal to induce magnetization inside the sheet with the field being applied in an essentially normal direction. While this first field is being applied a second weaker magnetic field is applied simultaneously with the first field. Or alternatively, the second weaker field can be applied at a lower temperature after the first field application. The sheets so produced have low hysteresis losses. Further, the sheets produced are about 0.02 mm and 0.1 mm thick and can be laminated and stacked for use in the manufacture of transformer cores. Besides being used to form transformer cores, the sheets can be laminated together to form bars and rods for other electronic applications. The magnetic properties of the amorphous alloy ribbon are extremely stress-sensitive and suffer degradation when wound into toroidal form. To avoid this problem shaped, toroidal forms of amorphous alloy are magnetically annealed.

Two recently issued patents to Hisey, U.S. Pat. Nos. 5,208,503 and 5,235,231 are directed to electric motor stators made from metallic glass or electrical steel.

Hisey in U.S. Pat. No. 5,208,503 fabricates composite stator structures utilizing ferromagnetic materials. He forms a composite stator magnetic circuit structure of both metal and structural plastic. Hisey in the '503 patent teaches the preparation of a circular stator lamination segment from a fanfolded straight strip of ferromagnetic material. He prepares a stator magnetic circuit ring structure from the fanfolded material by winding as a helix.

U.S. Pat. No. 5,235,231 to Hisey teaches a composite stator formed of fanfolded thin section metallic glass or edge wound to form a ring-like magnetic structure. He makes stator teeth from laminates of magnetic material.

The use of amorphous alloys for motor stators is shown by the prior art. The prior art does not show motor stators having specifically oriented magnetic fields in the teeth and in the yoke.

SUMMARY OF THE INVENTION

An object of this invention is to produce a more efficient motor by reducing motor operating power losses.

A further object is to produce improved AC synchronous and induction motors, as well as single phase and multiphase motors.

The above objectives are achieved by the use of an improved yoke and teeth in the assembly of the stator. In a specific embodiment the stator is produced of an amorphous magnetic metal alloy such that the magnetic orientation induced by the annealing step varies or is circumferential in the yoke and is radial in the teeth.

Bearing in mind that motor stators do not have as clear-cut a preferential magnetic field direction as transformer cores and that the direction of the field at many points in the stator changes with time, a modified magnetic annealing has been applied to a stator made wholly or in part of thin strip amorphous metal alloy. The annealing process consisted of applying a changing magnetic field while the stator temperature is raised as is taught from experience with magnetic annealing of transformer cores.

Because thin strip amorphous metal alloys are annealed at a significantly lower temperature than magnetic steels, it is possible to impose a magnetic field on a stator whose teeth are made of magnetic steel and whose yoke is made of thin strip amorphous metal alloy, in such a way as to produce a field circumferentially in the yoke, without disturbing the radial magnetic field or magnetic direction of the teeth. The magnetic direction of the teeth will not be disturbed because the annealing temperature for the yoke is too low to disturb the magnetic direction of the previously magnetized steel teeth. A preferred temperature for magnetic annealing is 300° C.

The inventors envision the stator teeth and stator yoke being prepared separately, then subjected to various magnetic annealing steps and assembled into a completed stator.

The inventors also disclose a number of processes to be used for improving the motor stator. For example, one process for preparing the stator yoke and teeth involves subjecting thin strip amorphous metal alloy to electromagnetic annealing wherein the orientation of the magnetic field of the thin strip corresponds with that encountered in the use of the stator. Specifically, the field direction during annealing for preparing the stator yoke varies or is circumferential; and for preparing the teeth the field direction is radial. The temperature of the electromagnetic anneal is 300° C. for several hours.

The magnetic annealing process can be carried out by applying a magnetic field in such a manner that the stator is maintained in a fixed position and the field rotated. Or in an alternate process the stator is rotated within a fixed electromagnetic field. In a still further embodiment an assembled motor or motor prototype is operated to produce a changing magnetic field in the annealing process.

Bearing in mind that it would be preferable to electromagnetically anneal in a manner which mimics the actual field of the motor stator, the inventors have assembled a stator in which the teeth are magnetic steel and the yoke, thin strip amorphous metal alloy. They have then brought up the temperature suitable for annealing and applied a magnetic field circumferential to the stator yoke. This was done by passing current through a single pass conductor positioned in or near the center of the stator.

In an alternative embodiment of the above process the inventors have placed a coil around the yoke and passed a current through the coil. As previously mentioned the object of the magnetic annealing process relative to the yoke is to produce in the yoke a circumferential magnetic orientation.

The invention herein disclosed contemplates modifications and alternatives to the processes set forth above. For example the magnetic field external to the stator can be created by a permanent magnet or created by a current in a coil.

A still further modification of the above process the electromagnetic anneal involves the use of a two pole magnet with poles 180° apart rotated outside the stator to produce a field similar to that seen when the motor is operated. Instead of rotating the poles of the magnet with the stator in fixed position, both the stator and the magnet can be rotated in the same or opposite directions. The magnet could be either permanent or one created by a coil.

The process of application can be performed either by using a two pole electromagnet, a permanent magnet employing properly orientated rotation or by A.C. current created in a coil.

In preparing the stator it is advantageous to manufacture the stator teeth from magnetic steel and the yoke from amorphous alloy. In such a case the teeth can be annealed separately before assembly with the yoke. After stator-assembly a further magnetic annealing is possible employing suitable temperatures (e.g., 300° C.) for the annealing process.

In an alternative embodiment of this invention for proper magnetic annealing of the stator assembly, a rotor equivalent made of magnetic material, e.g., iron, in the form of a cylinder is placed or operated in the center of the stator to play the role of the rotor while conducting the magnetic flux or magnetic annealing.

Employing the alternative embodiment two variations are possible. In one variation the rotor equivalent and air gap are chosen to produce optimal field lines. Optimal field lines are those which are as close as possible to the field lines seen in the actual operation of the motor.

In the second variation part of the annealing period occurs with the rotor equivalent in place and part of the annealing period is done without the rotor equivalent in place. The emphasis placed on circumferential field lines in the yoke, versus radial lines through the teeth, would then be controlled by the relative amounts of annealing time devoted to the two arrangements. The target result of the process is to obtain lines as much like the operation of the motor as possible. The second variation allows for the adjusting of the time of annealing with the rotor equivalent in place part of the time, and with the rotor equivalent out of place part of the time, to produce the desired effect in the yoke and teeth.

It is pointed out that with the rotor equivalent in place and with minimal or zero air gap the preferential field is radial in the teeth. Where the rotor equivalent is absent or there is a large air gap the preferential field is circumferential in the yoke.

DESCRIPTION OF PREFERRED EMBODIMENTS

Figure 1:
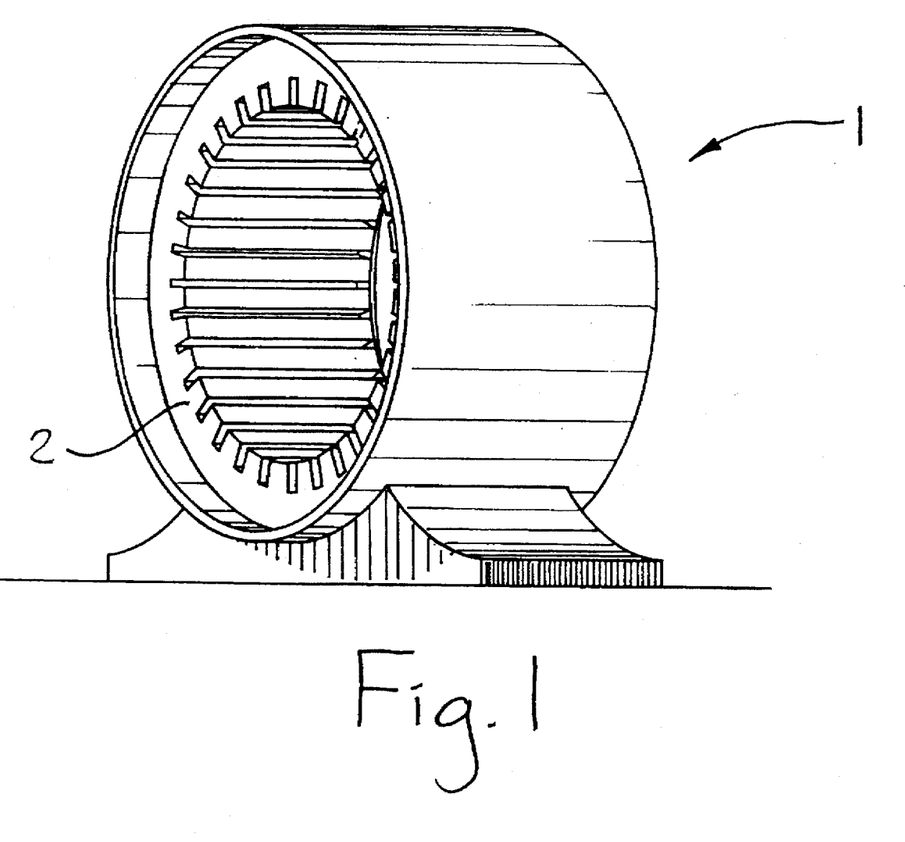
FIG. 1 is a perspective view of a stator long used in the prior art showing the yoke and the teeth as a single unit.

With reference to FIG. 1 the motor stator of the prior art 1 includes the teeth and yoke as a single unit 2. The prior art manufactured the teeth and yoke of the stator as a single unit 2 and did not recognize the benefit of a stator 3 wherein the field was radial in the teeth 4 and circumferential or varies in the yoke 5.

Figure 2:
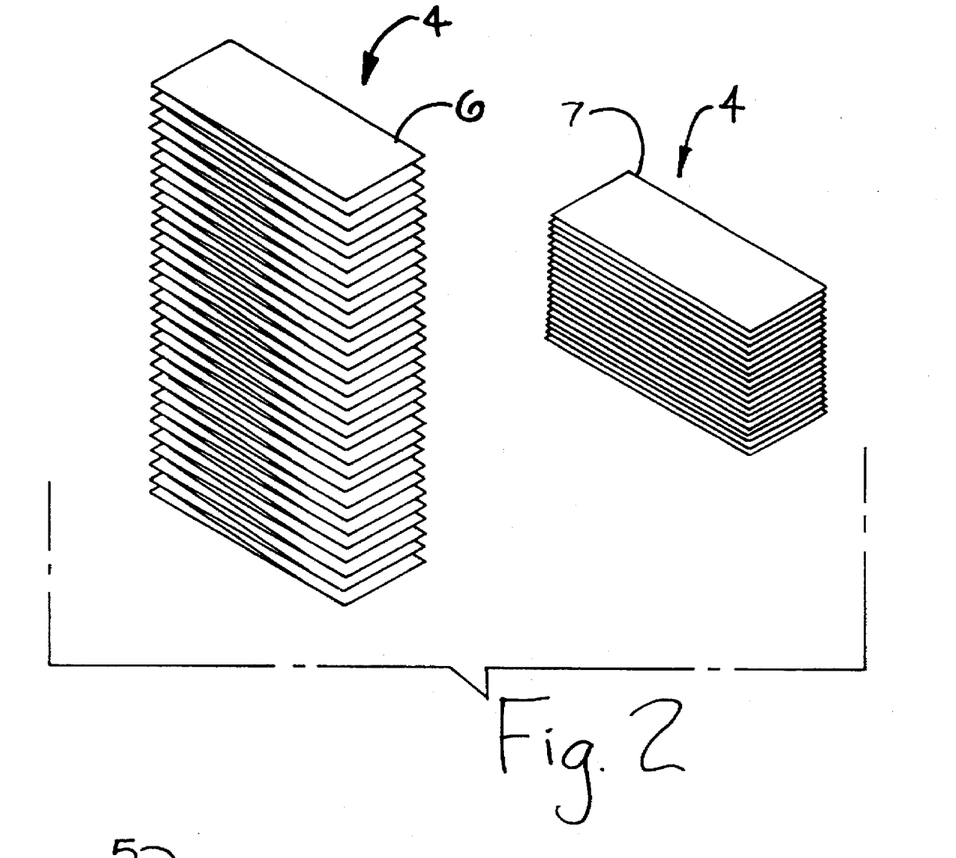
FIG. 2 is a view illustrating folded thin strips of amorphous magnetic alloy which will be used to make stator teeth of this invention. On the left the strip is shown loosely folded; and on the right the strip is more tightly folded.

The teeth 4 used in the stator of the present invention 3 can be made from thin sheet material (FIG. 2). The sheet material is a single thin strip of magnetic amorphous metal alloy which is folded into pleats in accordion fashion 6 and compressed 7 to form the stator teeth 4.

Figure 3:
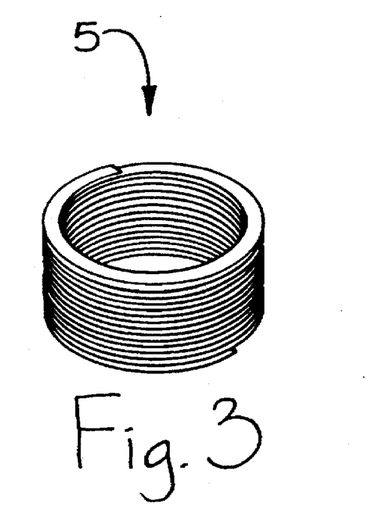
FIG. 3 is a view illustrating the helical strip of amorphous magnetic alloy which will be used to make the stator yoke of this invention.
Figure 4:
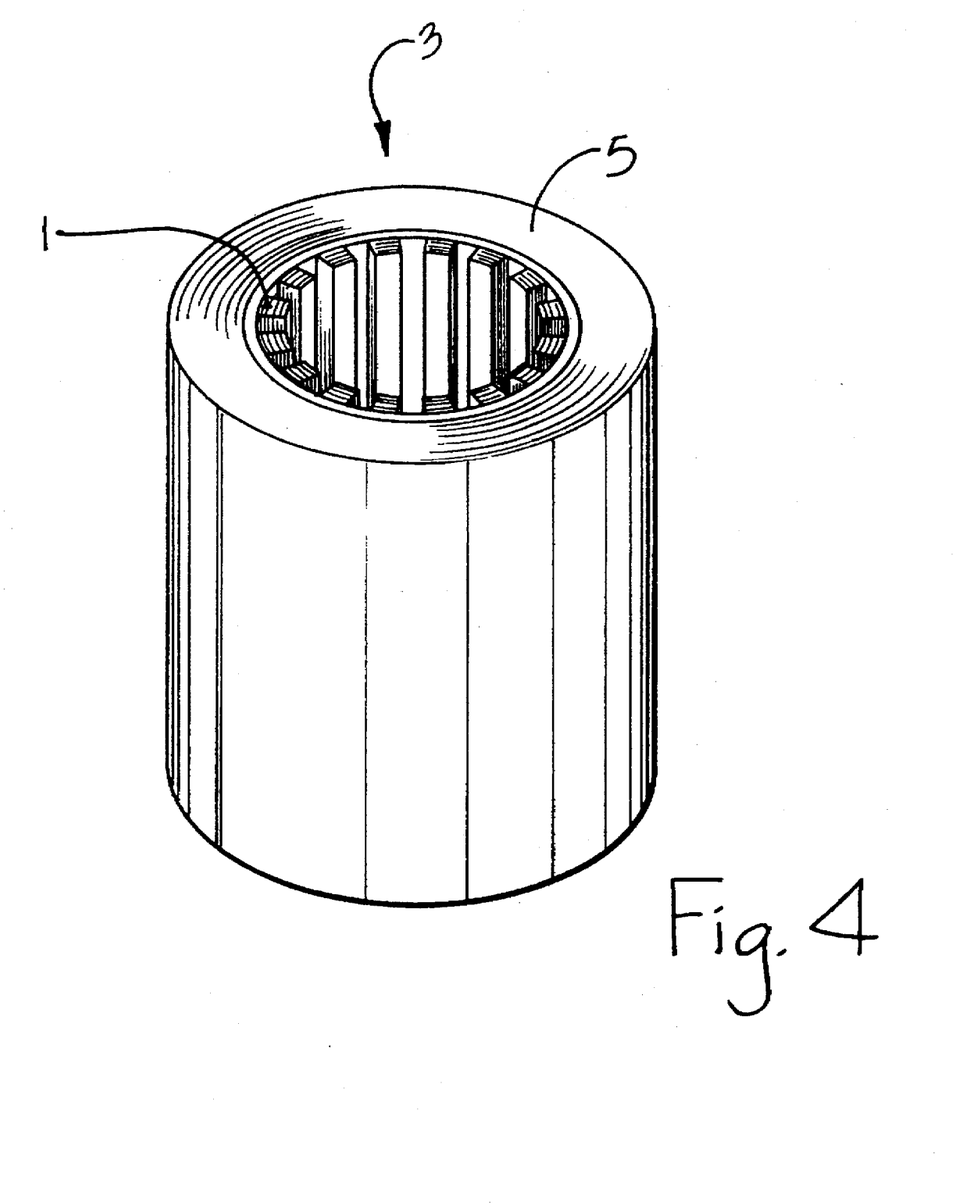
FIG. 4 is a perspective view of the assembled stator used in this invention.

The yoke 5 of the invention is made of a thin sheet of magnetic amorphous metal alloy in the form of a spiral or helix (FIG. 3). While the yoke 5 is shown in the form of a spiral or helix it can also be made of thin sheet magnetic amorphous metal alloy rolled in a manner similar to ribbon rolled on a reel so that the rolled sheet material would form the yoke 5. Once the yoke 5 and teeth 4 are made, they can be assembled to form the stator 3 (FIG. 4). The thin strips of amorphous metal alloy are bonded together using methods known in the art to make the teeth 4 and yoke 5. Then the bonded teeth 4 and yoke 5 are bonded to each other to form the stator 3. The process of magnetically annealing thin strips of metal alloy and forming these strips into stator teeth and yoke is known in the art (e.g. the patents to Hisey noted above).

In order to produce the amorphous electromagnetic material a thin strip or sheet of amorphous metal alloy is subjected to an electromagnetic annealing process. The apparatus (known in the art) for carrying out the electromagnetic annealing process is schematically illustrated (FIGS. 5-7).

Figure 5:
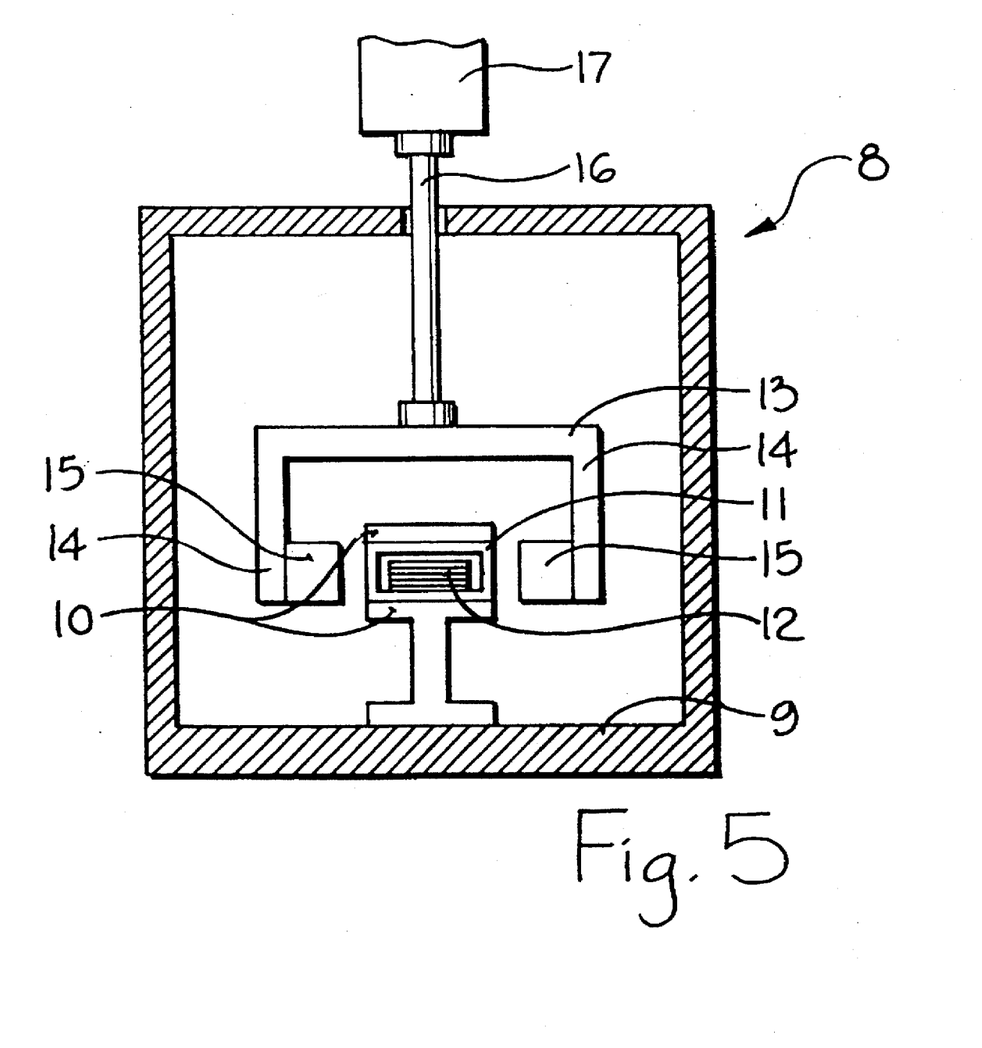
FIG. 5 is a schematic cross-sectional view of the device which will be used to electromagnetically anneal the thin strip amorphous metal alloy.
Figure 6:
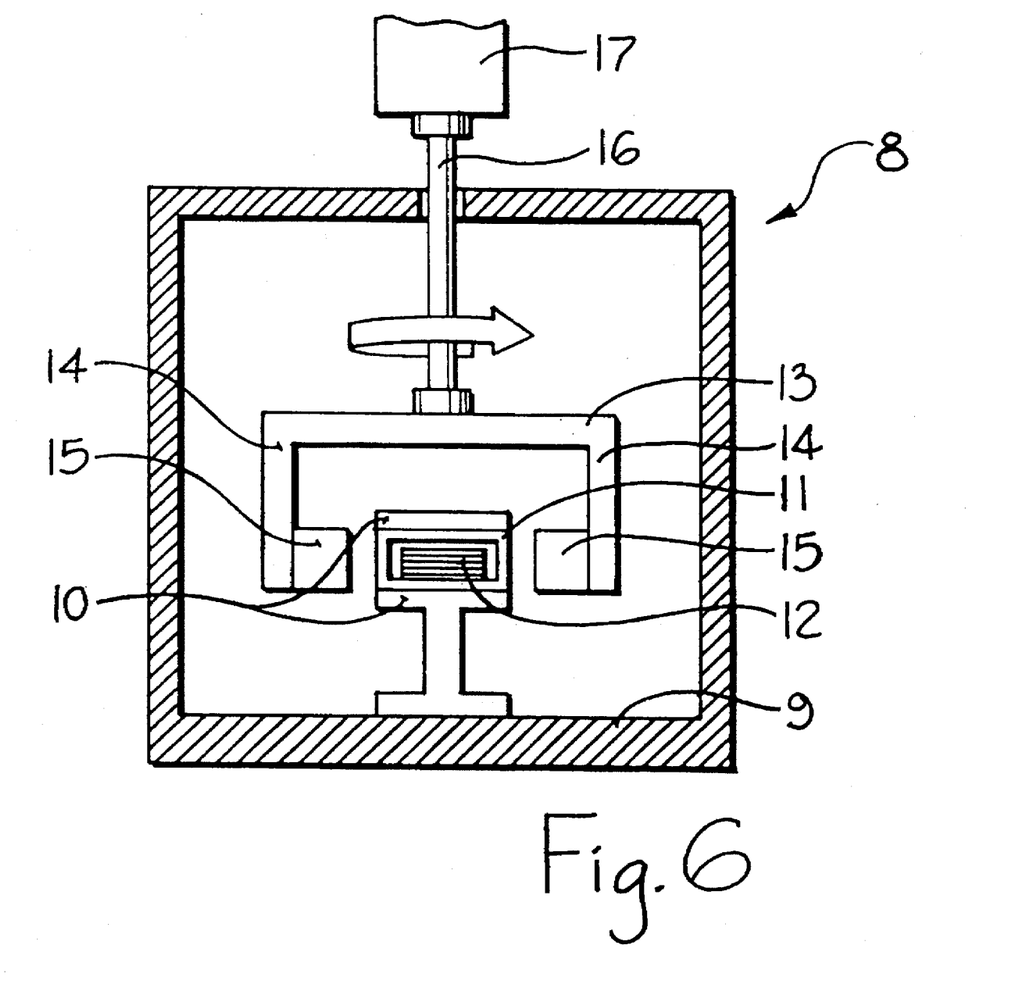
FIG. 6 is a schematic view thereof showing the magnets being rotated and the metal alloy held stationary.
Figure 7:
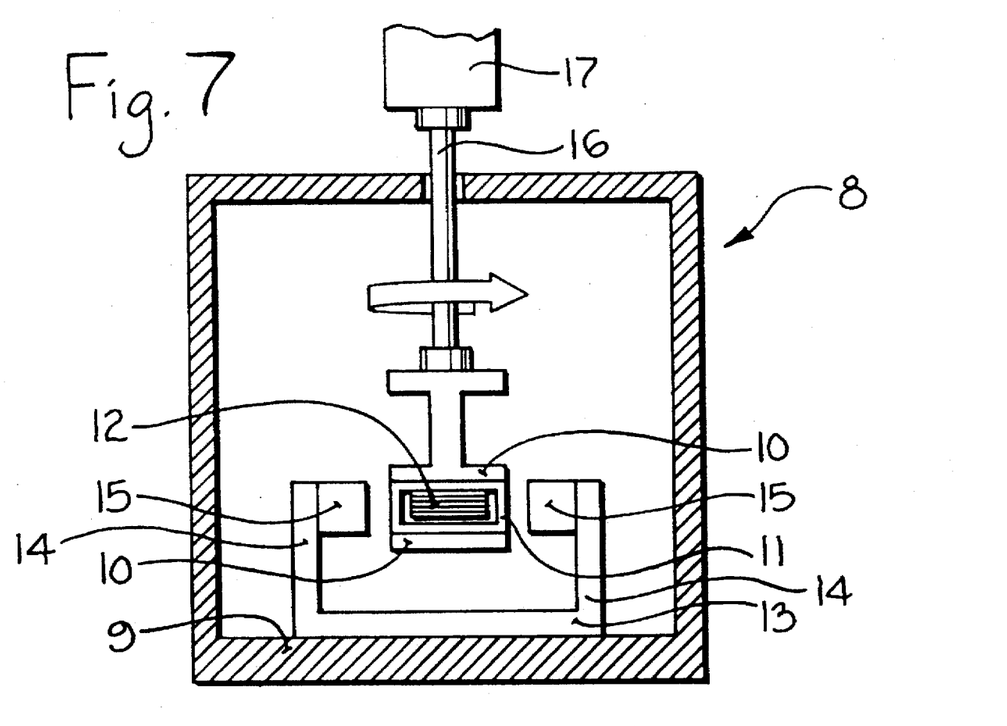
FIG. 7 is a schematic view thereof showing the metal alloy being rotated, with the magnets being held stationary.

With reference to FIGS. 5-7 an annealing apparatus 8, known in the prior art, is employed to electromagnetically anneal film or thin strips of amorphous metal alloy 12, which can be used to prepare the yoke and teeth of the stator. The annealing apparatus 8 includes a thermostatic chamber 9 which is provided with a casing holder 10 which accommodates a sample casing 11 for holding amorphous alloy film 12 during the annealing process. The sample casing 11 and casing holder 10 are made of non-magnetic material. Contained within the thermostatic chamber 9 is a U-shaped member 13 made of iron. On the inner end portion of each arm 14 of the U-shaped member 13 there is provided a magnet 15 of high magnetizing force. The middle portion interconnecting the two arms 14 of the U-shaped member 13 is integrally connected to one end of a driving shaft 16. The other end of the driving shaft is connected to a motor 17.

As an example of a method for carrying out the electromagnetic annealing process of this invention (FIG. 6) a sample strip or film of amorphous metal alloy 12 is placed in a sample casing 11 which in turn is placed in a casing holder 10. The thermostatic chamber 9 is heated. The casing holder 10, and the sample casing 11 containing the strip of amorphous metal alloy strip 12 are subjected to electromagnetic annealing. The electromagnetic annealing process (FIG. 6) rotates the magnets 15 while the sample casing 11 containing the amorphous alloy film 12 is held stationary. The arrow (FIG. 6) shows the direction in which the driving shaft 16 and the magnets 15 rotate while amorphous alloy film 12 is subjected to electromagnetic annealing.

As an alternative method of electromagnetic annealing (FIG. 7) the magnets 15 are held in a fixed position and the amorphous metal alloy strip 12 is rotated between the magnets 15. The arrow indicates the direction in which the amorphous alloy film is rotated.

The final orientation of the magnetic field vis-a-vis the amorphous metal alloy strip 12 will depend upon the relative positions of the amorphous metal alloy strip 12 and the magnets 15 during the electromagnetic annealing process. The amorphous metal alloy strip 12 can be held in a position in which the direction of the magnetic field is vertical with respect to the plane of the strip 12 or held in a position in which the direction of the magnetic field is parallel in respect to the plane of the strip 12. Of course the final orientation of the amorphous metal alloy strip 12 should be such as to create a film 12 in which the electromagnetic field is radial in the teeth 4 and circumferential or varies in the yoke 5 of the stator 3.

Figure 8:
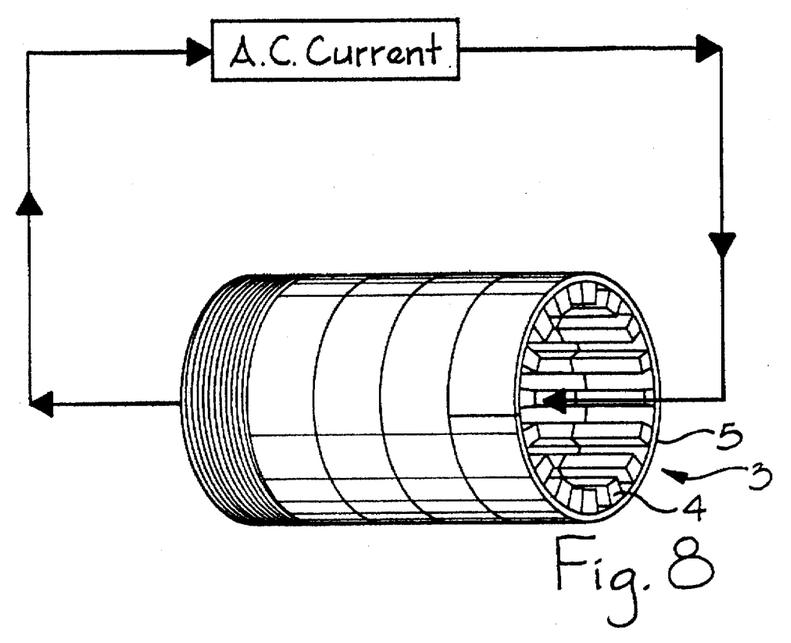
FIG. 8 is a schematic view showing the magnetic field being applied by an A.C. current single pass conductor positioned near the center of the stator.
Figure 9:
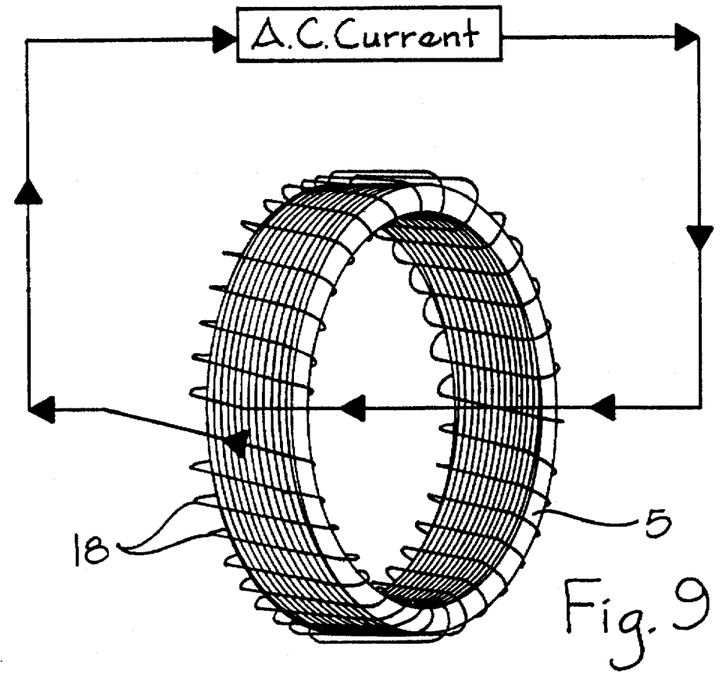
FIG. 9 is a schematic view showing a coil placed around the yoke and the A.C. current being passed through the coil.

Other methods can be employed to apply the electromagnetic field during the annealing process. In one method the stator 3 is assembled and a field created by an A.C. current single pass conductor is used to induce a magnetic field onto the stator 3 (FIG. 8). In another method a coil 18 is placed around the yoke 5 and an A.C. current passed through the coil 18 (FIG. 9). Note that in FIG. 8 the teeth are made of magnetic steel and are not laminated.

Figure 10:
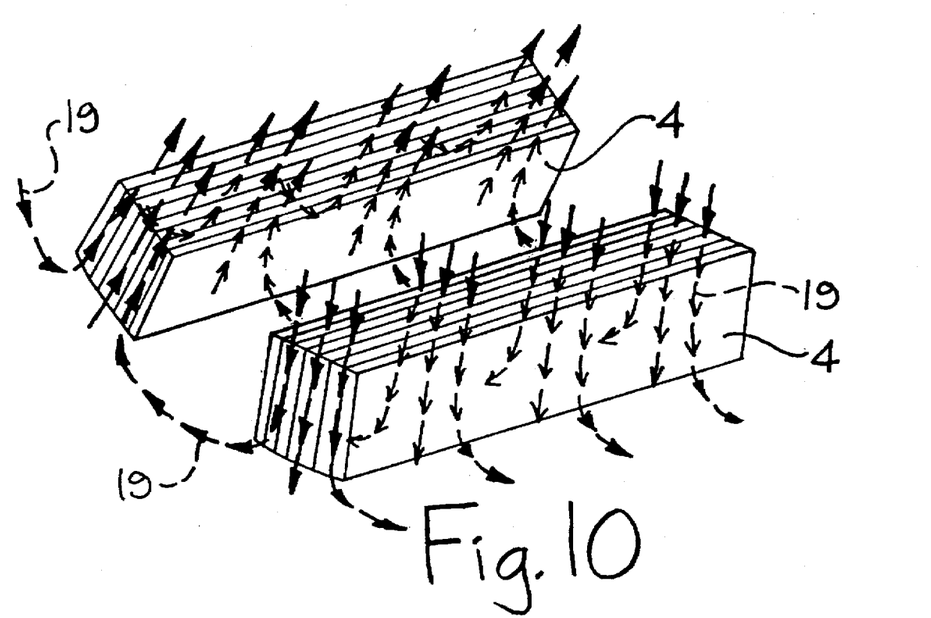
FIG. 10 is a schematic view of the stator teeth. The dashed lines represent the field as radial in the teeth.
Figure 11:
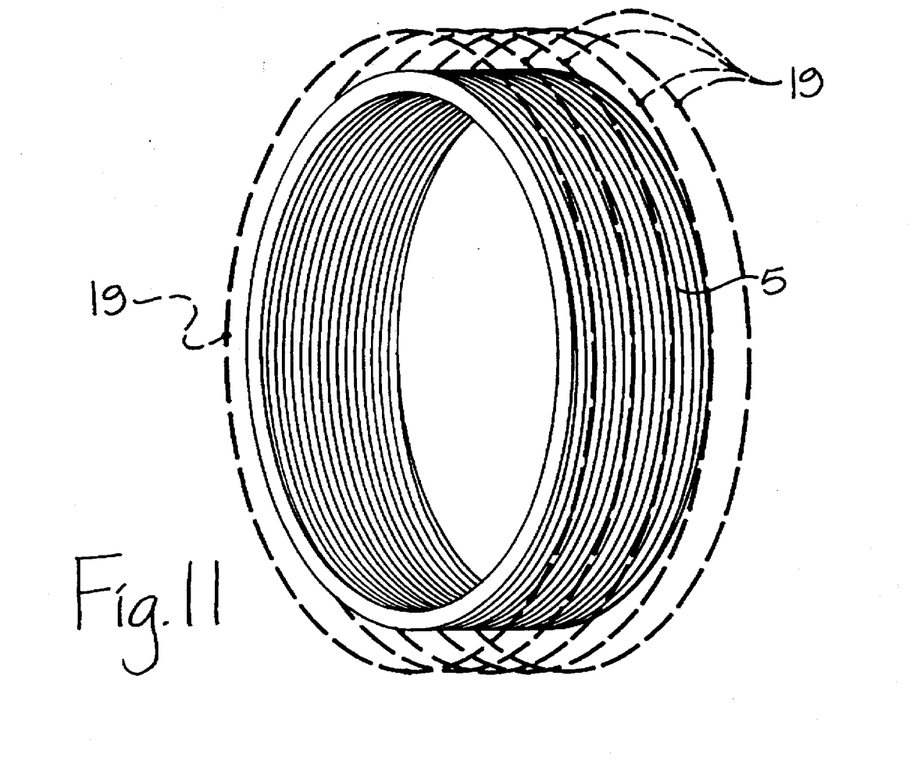
FIG. 11 is a schematic view showing the yoke, with the dashed lines representing the field as circumferential.
Figure 12:
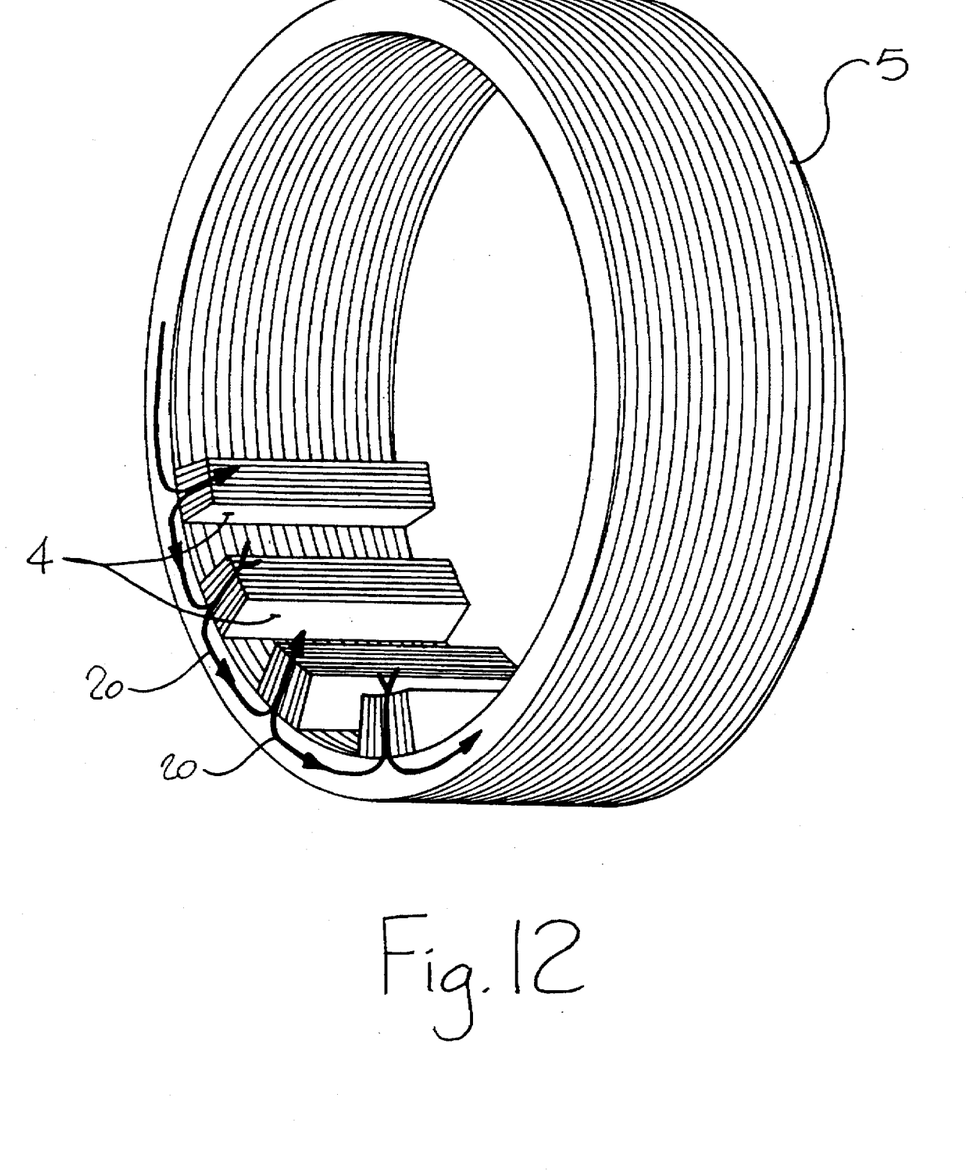
FIG. 12 is a schematic view showing the yoke and teeth assembled to form a stator. The lines with arrows represent the field as radial in the teeth and circumferential in the yoke.

With reference to FIGS. 10-12, an electromagnetic field is radial in the teeth 4 (FIG. 10) and circumferential in the yoke 5 (FIG. 11). In final assembly the teeth 4 and the yoke 5 are joined to form the stator 3 (FIG. 12). The field being oriented to be radial in the teeth 4 and circumferential in the yoke 5. The dashed lines in FIGS. 10-11 schematically represent the orientation of the magnetic field 19. The lines with arrows 20 in FIG. 12 represent the orientation of the field in the yoke 5 and teeth 4 of an assembled stator 3.

Figure 13:
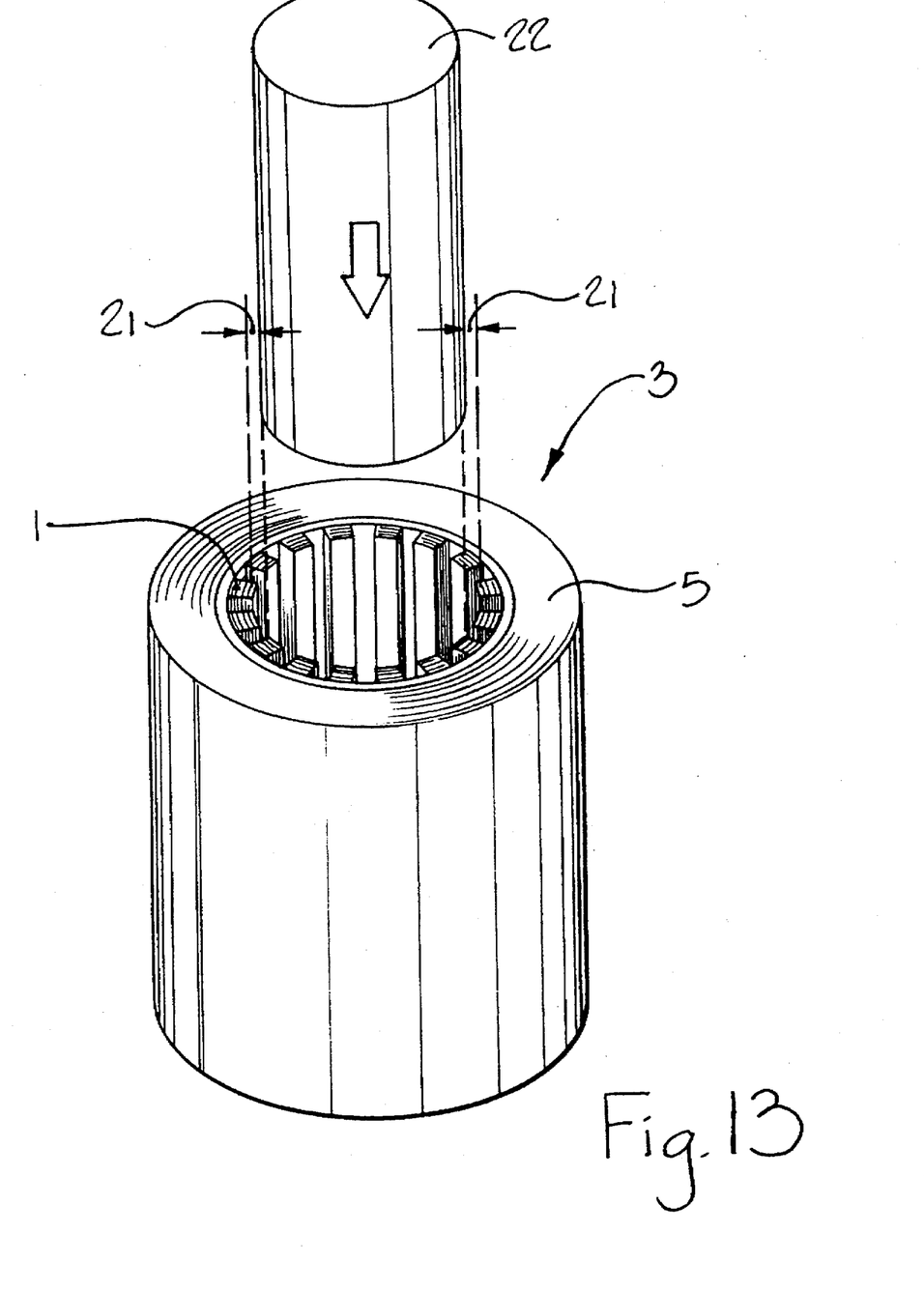
FIG. 13 is a view illustrating a rotor equivalent being inserted into a stator.

Regarding FIG. 13, the stator 3 receives the rotor equivalent 20 which can be made of a magnetic material, ferrous metal for example. The arrow shows the direction in which the rotor equivalent 22 will be inserted into the stator 3. The dashed lines 21 represent the air gap 21 between the rotor equivalent 22 and the stator teeth 4. As previously set forth, with the rotor equivalent in place and with minimal or zero air gap the preferential field is radial in the teeth. With the rotor equivalent absent or where there is a large air gap, the preferential field is circumferential in the yoke.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method for preparing a motor stator comprising providing a stator whose teeth are made of magnetic steel and whose yoke is made of thin strip amorphous metal alloy, imposing a magnetic field on said stator to produce a field circumferentially in the yoke with said magnetic field being applied at such a temperature as to effect magnetic annealing of the yoke without disturbing the magnetic field of the teeth.

2. The method of claim 1, wherein the magnetic field is applied to the stator by rotating the stator about the magnetic circuitry.

3. The method of claim 1, wherein the magnetic field is applied to the stator by rotating the magnetic circuitry about the stator.

4. The method of claim 1, wherein the stator is assembled into a motor or motor prototype and the motor or motor prototype is operated to impose the magnetic field.

5. The method of claim 1, wherein the magnetic field is applied to the stator by passing A.C. current through a single pass conductor positioned in or near the center of the stator.

6. The method of claim 1, wherein the temperature is about 300° C.

7. The method of claim 1, wherein a two pole magnet with poles 180° apart outside the stator are rotated to produce a field.

* * * * *